July 25, 1967 J. W. TILLS 3,332,582
TRANSPORTING AND DISPENSING ARRANGEMENT
Filed July 26, 1965 6 Sheets-Sheet 3
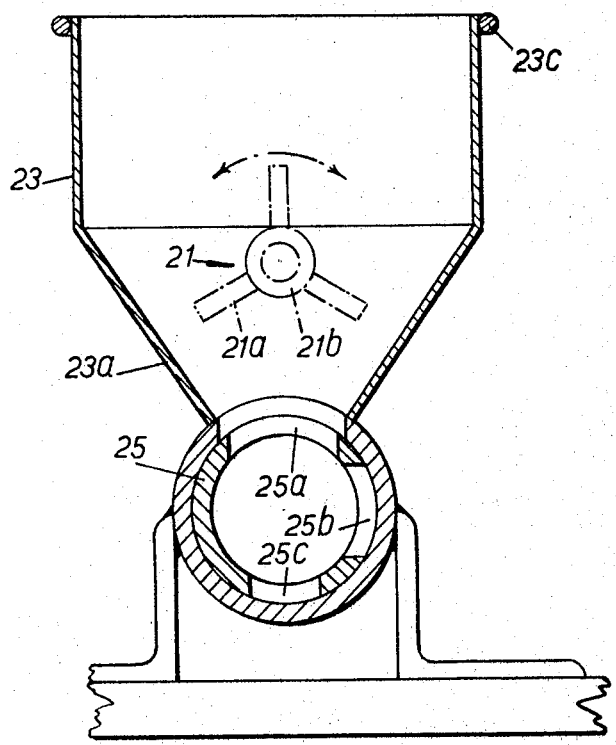
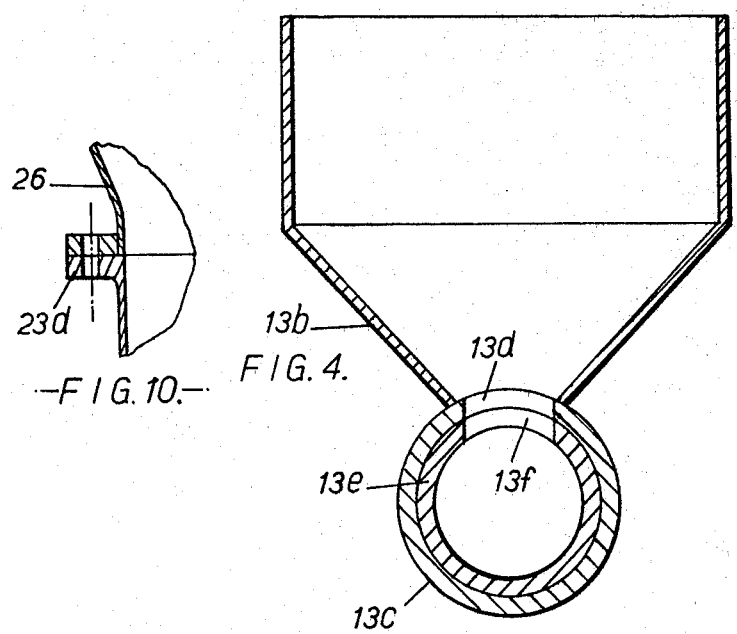
INVENTOR:
John William Tills
BY
Amster & Rothstein
Attorneys

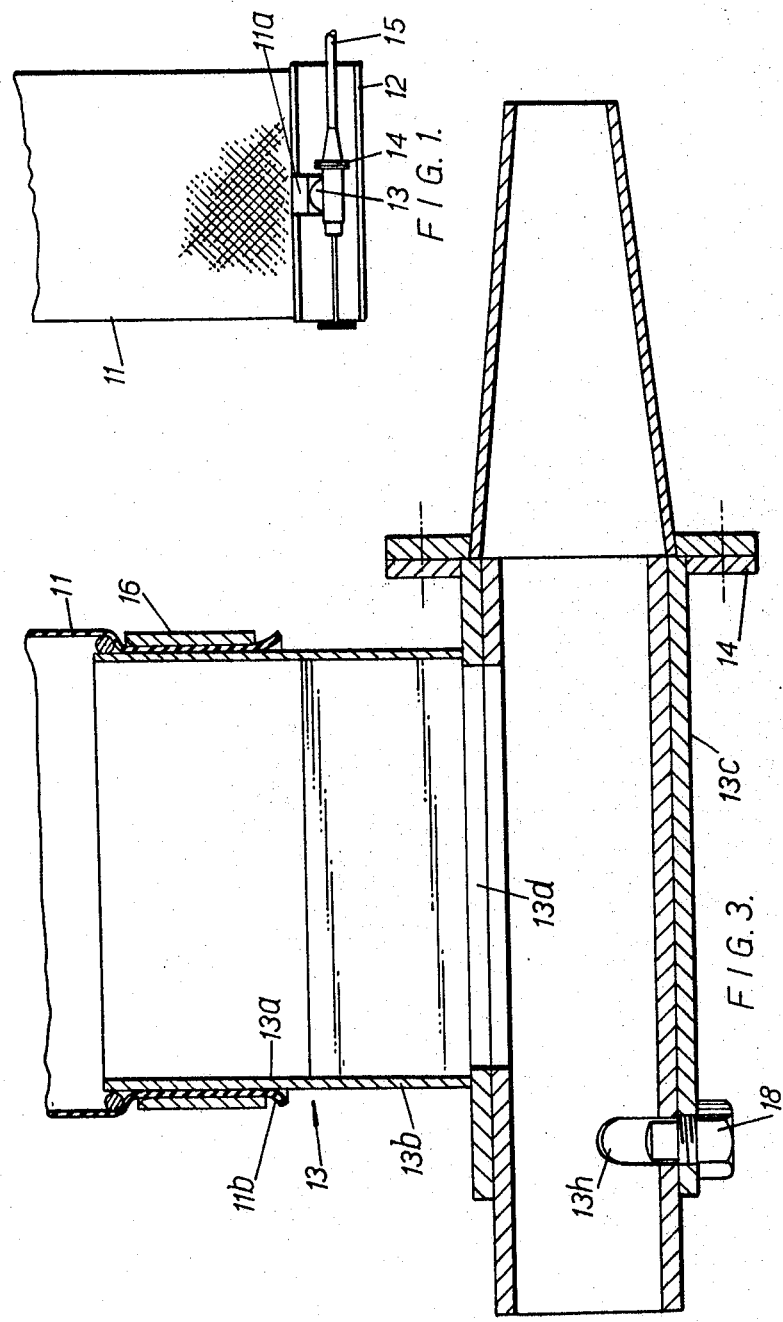

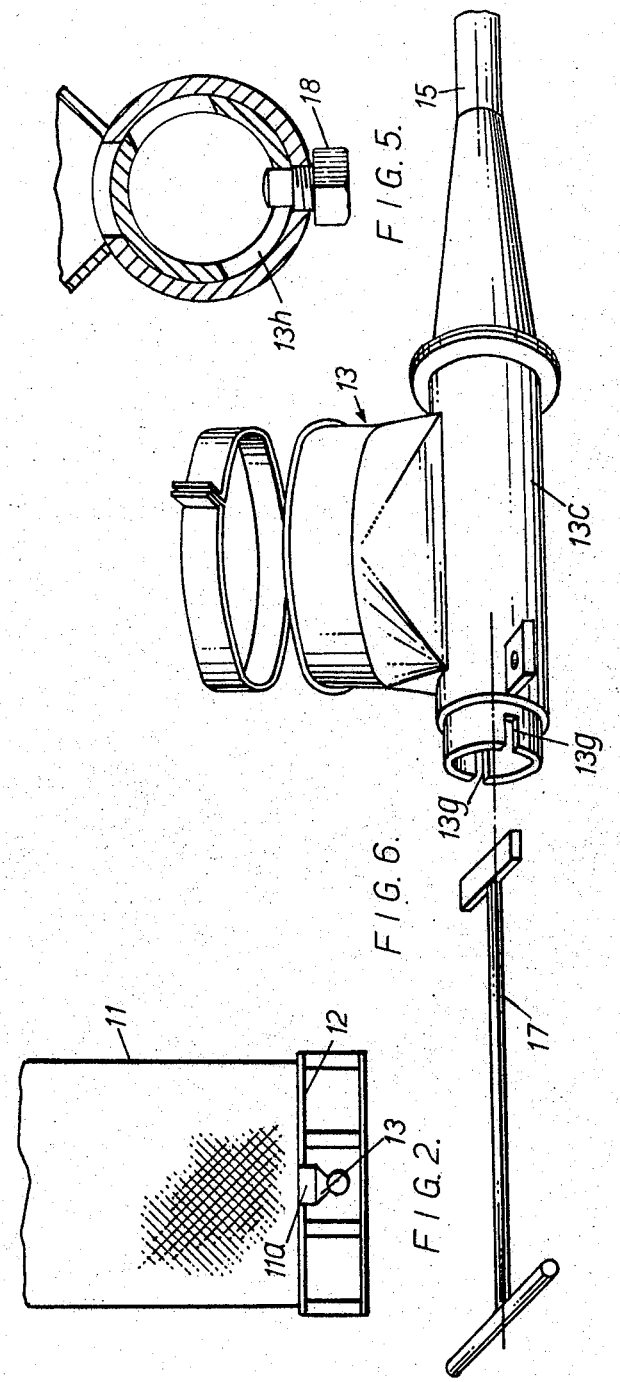

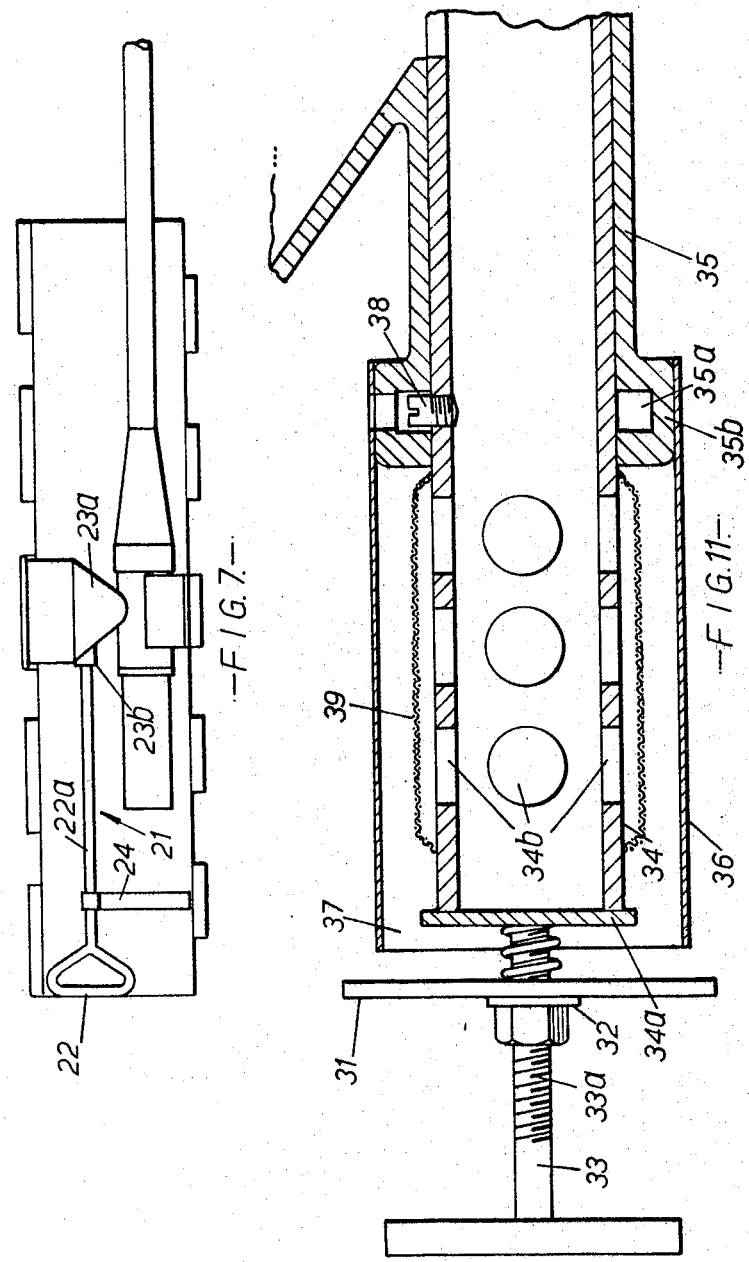

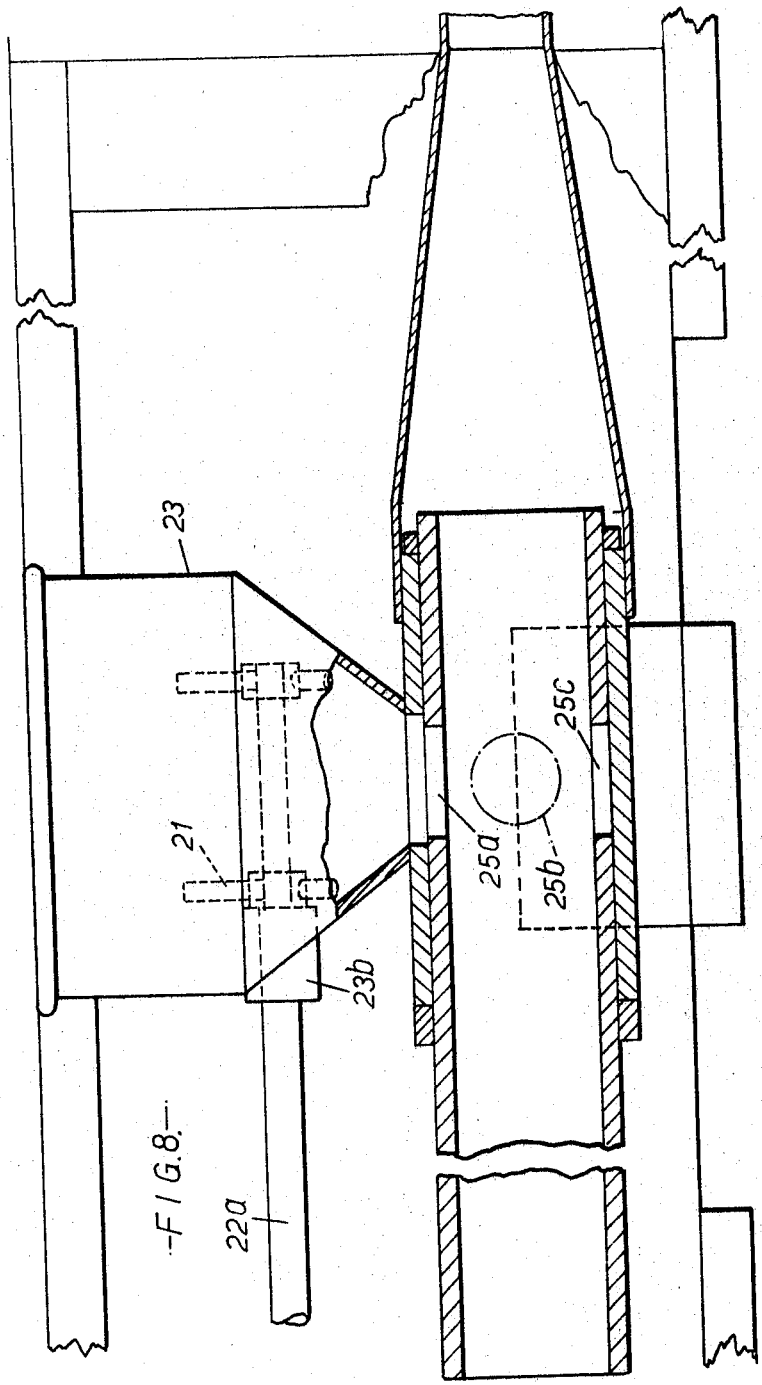

July 25, 1967  J. W. TILLS  3,332,582
TRANSPORTING AND DISPENSING ARRANGEMENT
Filed July 26, 1965  6 Sheets-Sheet 6
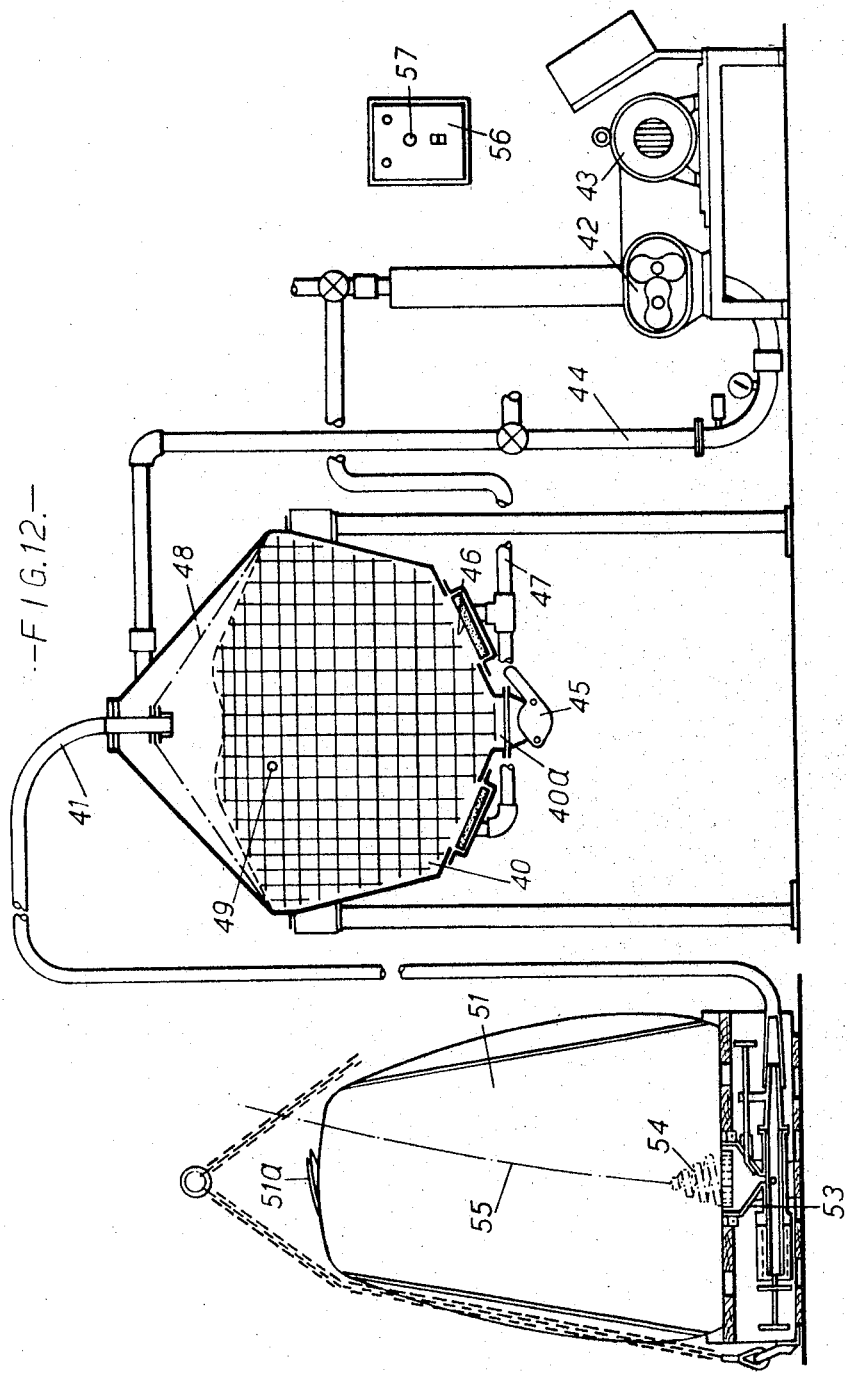
INVENTOR:
John William Tills
BY
Amster & Rothstein
Attorneys

United States Patent Office 3,332,582
Patented July 25, 1967

3,332,582
TRANSPORTING AND DISPENSING ARRANGEMENT
John W. Tills, Kirkby, near Liverpool, England, assignor to The Tills Engineering Co. Ltd., Kirkby, near Liverpool, England
Filed July 26, 1965, Ser. No. 474,561
Claims priority, application Great Britain, Oct. 14, 1964, 41,898/64
6 Claims. (Cl. 222—189)

The present invention concerns a transporting and dispensing arrangement for granular or pulverulent material.

An object of the invention is to provide a system whereby the material is readily transportable in a collapsible container adapted on arrival at a dispersal point to have its contents withdrawn and conveyed to a remote point for discharge as required.

According to the present invention a transporting and dispensing arrangement for granular or pulverulent material comprises in combination a collapsible container having an outlet opening at its lower end, a rigid support, preferably in the form of a lifting pallet beneath said container, and a valved outlet member engaged in said opening and presenting a demountable connection adapted to be hermetically joined to a suction conduit.

The suction conduit preferably forms part of a material withdrawing and conveying installation which may also include a collecting vessel, a vacuum system adapted to reduce the air pressure in said vessel, and a material outlet for gravitationally discharging material collected in said vessel as required, e.g. into a bag or sack.

The valved outlet member preferably includes a valve having a fully closed position, to be used in transit of the arrangement, and an open position adapted to present an adjustable or preselectable cross section of passage between the container outlet and the connection, The purpose of this variable passage is to enable the flow of material to be limited to that which safely avoids clogging the particular withdrawing and conveying system to which it is connected. A preferred control is effected by an at least partially rotatable valve member, the open position of which may be defined by a pin and hole or other variable setting device.

Alternatively the control of the valved outlet member may be effected by a rotary or partially rotary valve member having a plurality of alternative valve orifices of different sizes; for example there may be four alternative positions, i.e. closed, small opening, medium opening and large opening, denoted for example by differently coloured handle arms on the valve member.

When the arrangement is intended to be used in connection with powdery materials which are not free-running, i.e. having tendency to clog, the following further features of the invention may advantageously be incorporated. One of these features consists in the provision of an atmospheric air admission valve for controlling the degree of vacuum in the suction conduit. The air admission valve may be in the form of a plate mounted concentrically with or upon the spindle of the outlet valve. Another feature is the provision of a fluidised bed, energized by atmospheric air, for instance derived from the discharge side of a vacuum pump used for providing the necessary suction, this bed being situated at the base of the collecting vessel.

The invention will be described further, by way of example, with reference to the accompanying drawings, in which:

FIG. 1 is a fragmentary vertical section, partly in side elevation, of a preferred arrangement in accordance with the invention;

FIG. 2 is a view similar to that of FIG. 1, but partly in end elevation, i.e. seen at right angles to FIG. 1;

FIG. 3 is a fragmentary section of a detail, viewed in the same direction as, but on a larger scale than, FIG. 1;

FIG. 4 is a fragmentary section of a detail, viewed in the same direction as, but on a larger scale than FIG. 2; with the valve in a fully open position:

FIG. 5 is a fragmentary detail showing a portion of FIG. 4 with the valve in the closed portion;

FIG. 6 is a fragmentary perspective view;

FIG. 7 is a longitudinal elevation of an alternative embodiment;

FIG. 8 is a fragmentary longitudinal section of a detail corresponding to FIG. 7 but on a larger scale;

FIG. 9 is a fragmentary section of the detail shown in FIG. 8 but viewed at right angles thereto;

FIG. 10 is a fragmentary section of a detail showing a modification of the structure illustrated in FIG. 9;

FIG. 11 is a longitudinal section of a detail showing the additional feature of an atmospheric air admission valve provided for controlling the degree of vacuum in the suction conduit; and FIG. 12 is a diagrammatic view of a transporting and dispensing arrangement in accordance with the invention having its demountable connection hermetically joined to a material withdrawing and conveying installation which includes a fluidised bed at the base of its collecting vessel.

The invention provides an arrangement comprising in combination a collapsible container 11 (FIGS. 1 and 2) for granular or pulverulent solid material such as sugar, said container having an outlet opening 11a, a lifting support 12 beneath the container 11, and a valved outlet member 13 engaged in the opening 11a, and presenting a demountable connection 14 adapted to be hermetically joined to a suction conduit 15.

The member 13 (FIG. 3) includes a cylindrical upper portion 13a which may fit within the flexible neck 11b presenting the outlet of the container 11 and may be held therein by a suitable clip or band 16.

The member 13 also comprises a hopper shaped intermediate portion 13b (FIGS. 3 and 4) and an arcuate-section lower portion 13c having a slot 13d communicating with a longitudinal opening at the lower end of the portion 13b.

A valve 13e also of arcuate section is rotatable within the lower portion 13c and presents a slot 13f adapted to be aligned with the slot 13d in the lower portion of the member 13.

A key 17 (FIG. 6) may be engageable in diametrically aligned notches 13g in the outer end of the valve 13e for rotating the valve between the fully closed position (FIG. 5) and the fully open position (FIG. 4), these positions being defined by a stop bolt 18 engageable in a circumferentially extending slot 13h (FIG. 5) of the valve. Preferably however a transversely extending lever is secured to the valve 13e and lug stops are carried on an adjacent upright of the support member 13, at least one of the lug stops having an aperture so that the lever may be padlocked in the closed position of the valve 13e and the other lug stop being adjustable to a position corresponding to an optimum valve setting dependent upon the configuration of the valve openings and the degree of vacuum available.

The skin friction presented by the length of conduit 15 will vary from installation to installation, and the extent to which the valve can be opened should be pre-set to provide the maximum practicable valve through way cross-section which avoids clogging of the conduit 15.

In the alternative embodiment of FIGS. 7, 8 and 9 a reciprocatory and rotary manually operated rake 21 is situated within a frusto-conical lower portion 23a of a valved outlet member 23. The rake 21 is actuated by a handle 22 forming the termination of a rod 22a mounted in a bracket 24 and passing through a boss 23b extending through the wall of the body portion 23a.

The rake 21 comprises three arms extending radially from a boss 21b fixed to the end of the rod 22a remote from the handle 22. By suitable manipulation of the handle 22 any tendency towards jamming of material in the central region of the body 23 can be relieved.

This alternative embodiment includes a rotary valve 25 having three alternative slots 25a, 25b and 25c of differing sizes, capable of being positioned to control flow of material from the open lower end of the frusto-conical portion 23a as required.

In the embodiment shown in FIG. 9 the upper edge of the valved outlet member 23 carries an external peripheral bead 23c which is suitable to secure attachment of the member 23 to a flexible container.

In order to facilitate the attachment of the member 23 to a flexible container, and, when required, its detachment therefrom, a modified structure as shown in FIG. 10 may be employed. In this modification the bead 23c is replaced by a flange 23d (FIG. 10) which is adapted for bolting to a complementary flange on a rigid orifice piece 26 which is permanently secured in the lower opening of a flexible container (not shown).

In cases where the arrangement is to deal with a powdery material having marked tendency to clog the discharge passages or conduits, it is advantageous to be able to control the degree of vacuum in the suction conduit by variation of the amount of atmospheric air directly admitted thereto. This can be achieved as shown in FIG. 11 wherein an adjustable plate valve 31 is mounted on an internally screw-threaded boss 32 engaging threads 33a of a spindle 33 connected to a hollow cylindrical valve 34 of a valved outlet member. This valve 34 is rotatable within a fixed housing 35 extending horizontally from a lower portion of the valved outlet member. The valve 34 is axially constrained relative to the housing 35 by a grub screw 38 engageable against the end faces of an annular cavity 35a disposed within an enlarged end portion 35b of the housing 35. A cylindrical jacket 36 attached to the housing portion 35b extends coaxially with the valve 34.

The valve 34 incudes an end plate 34a and is pierced by a group of bores 34b. In operation atmospheric air enters the suction conduit by passing in through the annular opening 37 defined by the open end of the jacket 36 and the periphery of the plate 34a, and thence into the valve 34 via the bores 34b. The valve 34 may advantageously carry a tubular air filter 39, e.g. composed of a plastics material, intended to prevent entry of foreign matter with the air stream. This filter is preferably spaced away from the bores 34b so as to present a filtration area which is initially substantially larger than the sum of the individual cross sections of the bores 34b in order to avoid restriction of the air flow due to partial clogging of this filter. The air flow can be reduced by moving the plate 31 closer to the valve 34 thus rendering the spacing of the plate 31 from the open end of the jacket 36 decisive for the air inlet cross section, i.e. when the plate is quite close to the jacket the restriction between these parts will be substantially greater than that offered by the annular opening 37. Alternatively an apertured rotary plate valve (not shown) can be provided to control the air inlet cross section.

FIG. 12 illustrates one embodiment of transporting and dispensing arrangement in its relationship to a material withdrawing and conveying installation. The latter includes a collecting vessel 40 with a suction conduit 41 connected to the transporting and dispensing arrangement and a vacuum system comprising a vacuum pump 42 driven by a motor 43 and connected to the vessel 40 by a vacuum pipe 44. The vessel 40 has a material outlet 40a controlled by an outlet valve 45. Near the base of the vessel 40, in sloping wall portions thereof fluidising tiles 46 are fitted, these tiles being supplied with atmospheric air under pressure via a pipe 47 connected to the discharge side of the vacuum pump 42. The fluidised bed of material thus produced in operation around the lower layers of material in the vessel 40 avoids clogging and ensures a free running discharge even of powdery materials of small particle size and low specific gravity.

The vessel 40 also preferably includes an inverted frustoconical filter 48 having its apex fitted between flanges fixed adjacent the inner end of the suction conduit 41. A high level capacity sensitive probe 49 is provided in the vessel 40 in order to determine the upper limit of filling.

The container 51 of the transporting and arrangement to which the conduit 41 is connected may be of rigid construction, or it may be a flexible container as shown in FIG. 12. This flexible container is conveniently provided with an opening upper end 51a which is normally closed e.g. by means of a sliding fastener.

In order to avoid jamming and arching of material within the container 51, especially in the region immediately above its valved outlet member 53, a coiled spring 54 of flattened or strip material is arranged with its largest and lowest convolution attached to the inner periphery of the upper end of the member 53. The smallest and highest convolution of the spring 54 is attached to the lower end of a tension element as a cord or wire 55 the material within the container is disturbed by the upward extension of the spring and clogging above the member 53 is avoided.

The direction of rotation of the electric motor 43 is controlled from a panel 56 which includes a reversing switch 57 adapted in operation to reverse the connection between two phases of a three phase alternating current supply and the motor 43. Such reversal causes the vacuum pump 42 to act as a compressor thereby raising the pressure within the pipe 44 to a value above atmospheric pressure, this air acting to deform the filter 48 downwardly for cleaning purposes.

I claim:
1. In combination with a withdrawing and conveying installation for granular and for pulverulent material, said installation including a collecting vessel provided with an outlet for gravitationally discharging material collected therein and a suction conduit constituting an inlet for such material into said collecting vessel; a material transporting and dispensing arrangement comprising a collapsible container having an outlet opening, a lifting pallet attached to said container so as to provide a rigid support therefor, and a valved outlet member engaged in said container outlet opening and presenting a demountable connection hermetically joined to said suction conduit.

2. In combination with a withdrawing and conveying installation for granular and for pulverulent material, said installation including a collecting vessel provided with an outlet for gravitationally discharging material collected therein, a suction conduit constituting an inlet for such material into said collecting vessel, and a fluidised bed energisable by atmospheric air at the base of said collecting vessel; a material transporting and dispensing arrangement comprising a collapsible container having an outlet opening, a lifting pallet attached to said container so as to provide a rigid support therefor, and a valved outlet member engaged in said container outlet opening and presenting a demountable connection hermetically joined to said suction conduit.

3. A structure according to claim 2, in which the fluidised bed is energised by atmospheric air derived from the discharge side of a vacuum pump used for providing the suction necessary for operation of the material withdrawing and conveying system.

4. A structure according to claim 3, also including a frusto-conical filter disposed within the collecting vessel of the material withdrawing and conveying system, the filter apex being fitted between flanges fixed adjacent the inner end of the suction conduit extending from said vessel to said valved outlet member.

5. A structure according to claim 2, in which the collecting vessel also includes a probe for determining the upper filling level.

6. A structure according to claim 2, in which an electric motor for driving a vacuum pump providing a vacuum supply to the collecting vessel is reversible in order to provide a pressure above atmospheric for cleaning the frusto-conical filter.

References Cited

UNITED STATES PATENTS

| | | | |
|---|---|---|---|
| 1,017,292 | 2/1912 | Hyde | 251—207 |
| 2,791,470 | 5/1957 | Jolley | 302—58 |
| 3,182,425 | 5/1965 | Goss et al. | 222—193 X |
| 3,199,726 | 8/1965 | Pierson | 222—105 X |
| 3,201,004 | 8/1965 | Plonski | 222—228 |
| 3,208,719 | 9/1965 | Hulsey | 251—207 |
| 3,253,751 | 5/1966 | Paton | 222—195 |

ROBERT B. REEVES, *Primary Examiner.*

STANLEY H. TOLLBERG, *Assistant Examiner.*